United States Patent [19]
Bir

[11] 3,909,207

[45] Sept. 30, 1975

[54] VERTICAL STIRRED MASS POLYMERIZATION APPARATUS

[75] Inventor: Wallace G. Bir, Creve Coeur, Mo.

[73] Assignee: Monsanto Company, St. Louis, Mo.

[22] Filed: Mar. 9, 1973

[21] Appl. No.: 339,781

[52] U.S. Cl. .................... 23/285; 259/8; 165/109
[51] Int. Cl.².... B01J 1/00; B01F 7/16; F28F 13/12
[58] Field of Search ...... 23/285; 260/93.5 R; 259/7, 259/8; 165/109

[56] References Cited
UNITED STATES PATENTS

| | | | |
|---|---|---|---|
| 2,875,027 | 2/1959 | Dye............................. | 23/285 |
| 3,373,802 | 3/1968 | Wiklund et al. .................. | 165/109 |
| 3,679,651 | 7/1972 | Kii et al. ...................... | 260/93.5 |

*Primary Examiner*—Morris O. Wolk
*Assistant Examiner*—Roger F. Phillips
*Attorney, Agent, or Firm*—Joseph S. Nelson; Edward P. Grattan; James C. Logomasini

[57] ABSTRACT

Reactor for continuous mass polymerization of alkenylaromatic monomers comprising a vertically oriented cylindrical chamber, means to cool at least the lower portion of the chamber, and agitating means comprising a plurality of integral circular disks positioned in vertically spaced relationship along a rotating vertical central shaft, each disk having attached at spaced intervals about its circumference a plurality of radially extending flat blade members. The blade members on the lowermost disk are vertically oriented, whereas the blades on the remaining disks are angularly displaced about their horizontal axes.

8 Claims, 5 Drawing Figures

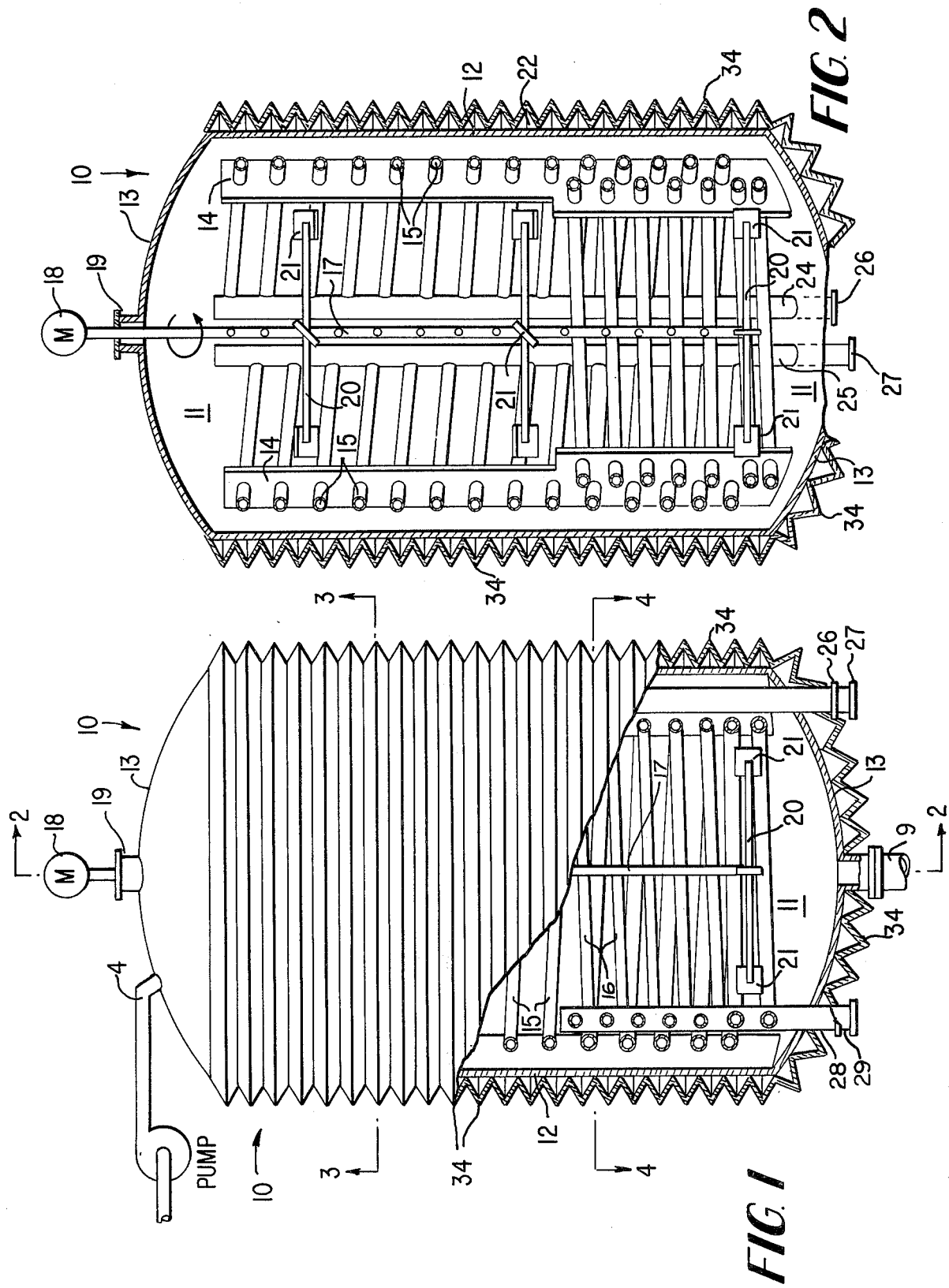

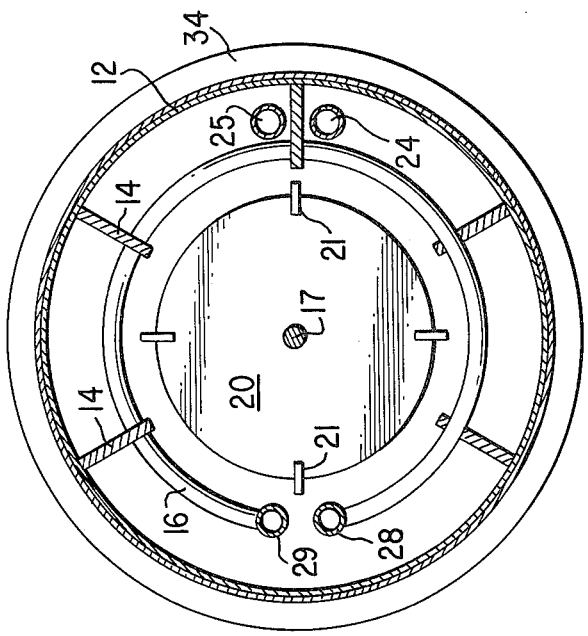
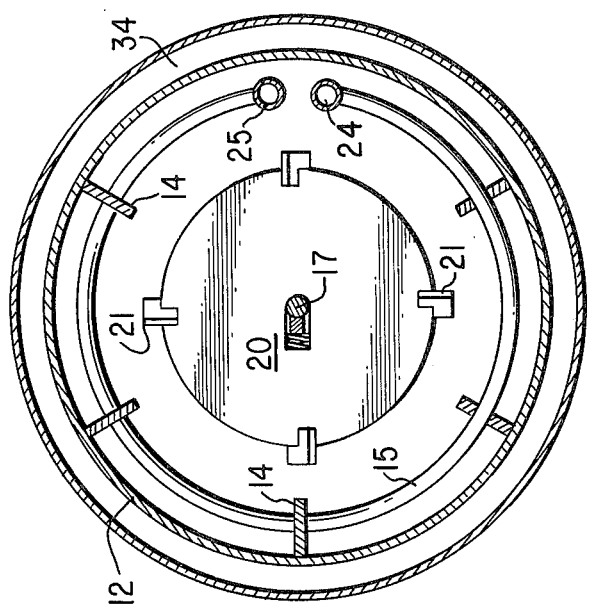

VERTICAL STIRRED MASS POLYMERIZATION APPARATUS

BACKGROUND OF THE INVENTION

The present invention relates to a polymerization apparatus, and more especially to a vertical stirred reactor for the mass polymerization of alkenylaromatic monomers.

In the manufacture of alkenylaromatic polymeric products, and particularly in the manufacture of homopolystyrene and impact polystyrene, i.e., elastomer-modified polystyrene containing graft polymerized diene rubber particles dispersed in a homopolystyrene matrix, a great deal of interest has been shown recently in the use of continuous mass polymerization techniques. When such techniques are employed, however, there arise certain inherent problems which msut be overcome in order to economically conduct the process and at the same time maintain the necessary degree of quality control in the product. For example, after polymerization it is necessary to separate from the polymer any unreacted styrene monomer, lest the same be wasted at great expense. Moreover, it is also quite common to employ various additive ingredients, such as internal lubricants, dyes or tints and the like, to produce a given polymer composition. Therefore, problems also arise in achieving proper introduction of such additives into the polymerization process as well as in connection with preventing the loss of prohibitively high amounts of the additives from the product polymer during the styrene monomer removal operation.

It has been suggested recently that some of these problems may be overcome by employing a combination of at least two polymerization reactors in series relationship whereby it would be possible to more carefully tailor the molecular weight of the polymeric products obtained as well as permit the selective introduction of various desirable additives at different points along the process stream representing various degrees of polymerization of the alkenylaromatic monomer. In order to achieve satisfactory results from such a tandom reactor arrangement, however, it is necessary to employ as the first, prepolymerizing reactor one which is specifically designed for its intended role.

In accordance with the present invention, there has been discovered a novel reactor design which is particularly well suited for employment as a pre-polymerizing reactor in a process for continuous mass polymerization of alkenylaromatic monomers.

SUMMARY OF THE INVENTION

The present invention therefore relates to an apparatus which is particularly adapted for use in the continuous bulk polymerization of alkenylaromatic monomers, especially styrene monomers. The polymerization reactor of the invention comprises a vertically oriented, generally cylindrical chamber formed by an outer casing and provided with terminal closures to define a generally closed chamber. The chamber is further provided with a monomer input opening near its upper end and a polymeric product output opening near its lower end. Cooling means are provided for at least the lower portion of the reactor chamber, suitably by means of at least one set of cooling coils extending around the entire circumference of the inner wall of the reactor chamber. In a preferred embodiment, the cooling means comprises a first set of cooling coils extending around the circumference of the reactor chamber and being positioned in vertically spaced relationship adjacent the entire vertical length of the inner wall of the chamber casing, these cooling coils further being supported by a plurality of vertical baffle members positioned in spaced relationship about the circumference of the chamber casing. A second set of cooling coils is also provided, which likewise extends around the entire circumference of the chamber but is positioned radially inwardly from the first set of cooling coils and extends vertically from the bottom of the chamber to a height which is at least above the plane of the lowermost agitation member in the reactor.

The aforementioned agitation means are provided along a vertical center shaft in the reactor chamber by placement thereon of a plurality of integral circular horizontally oriented disk members positioned in vertically spaced relationship. Each of the disk members has attached thereto at spaced intervals about its circumference a plurality of radially extending flat blade members, with the blade members of the lowermost disk being vertically oriented with respect to their flat surfaces whereas all blade members of the remaining disks have their flat surfaces oriented at an angle other than perpendicular with respect to the plane of the horizontal disk. Means are also provided on the shaft for making vertical adjustment of the placement of the disks along the shaft. A preferred reactor embodiment contains a total of three disk members, each having four blade members positioned at 90° radial intervals about the circumference thereof. In this embodiment, the blade members of the upper two disk members have their flat surfaces oriented at a 45° angle with respect to the plane of the horizontal disk. The polymerization reactor of the invention may also be provided with a heating fluid jacket which surrounds at least the sidewall portions of the chamber casing and preferably also the bottom surface of the casing.

BRIEF DESCRIPTION OF THE DRAWINGS

The invention will be better understood with reference to the attached drawings, wherein:

FIG. 1 is a front elevation view, partly in section, of the polymerization apparatus in accordance with the present invention;

FIG. 2 is a vertical cross-section taken along the line 2—2 in FIG. 1;

FIG. 3 is a horizontal cross-section taken along the line 3—3 in FIG. 1;

FIG. 4 is a horizontal cross-section taken along the line 4—4 in FIG. 1; and

DETAILED DESCRIPTION OF THE INVENTION

Figure 5:
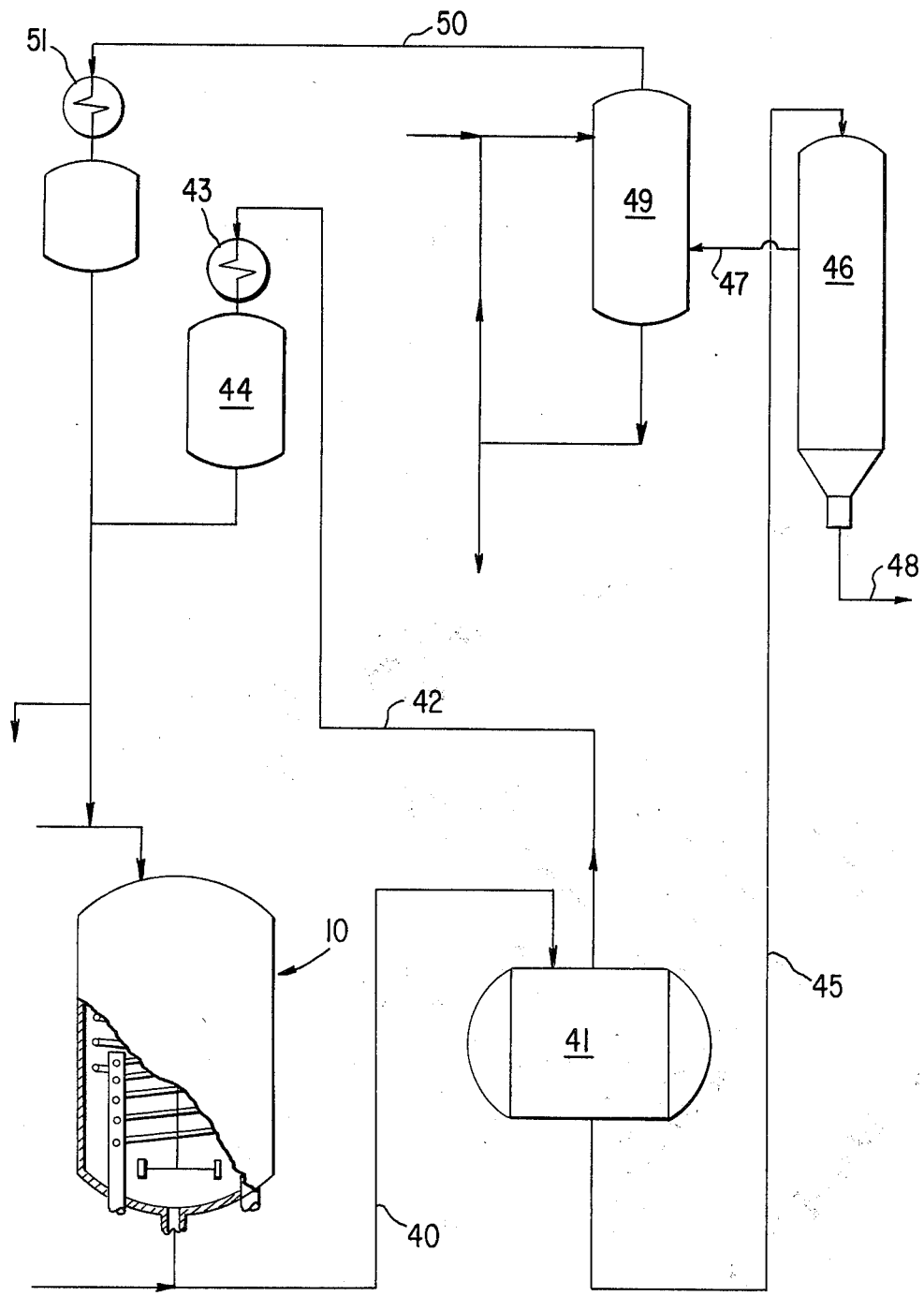
FIG. 5 is a diagrammatic and schematic flow diagram illustrating how the polymerization apparatus of the present invention is incorporated into a continuous styrene polymerization process.

The term "alkenylaromatic monomer" as employed in the present application is intended to encompass both styrene itself as well as the conventionally utilized derivatives thereof including the alkyl substituted styrenes such as alpha-methyl styrene, and the halogenated styrenes such as para-bromo styrene, para-dichloro styrene, and the like. Similarly, by the term "alkenylaromatic polymer", it is intended to include those materials resulting from polymerization of the aforementioned monomers, including homopolymers and copolymers of same in addition to graft copolymers produced by polymerization of one or more of said monomers in the presence of a preformed polymeric material, such as a diene polymer. The detailed description of the present invention, however, will be set forth with reference to the polymerization of styrene, the most conventionally employed alkenylaromatic monomer, with the intention that the same will be deemed illustrative of the entire class of alkenylaromatic compounds.

Referring now to FIG. 1, there is illustrated the reactor of the present invention designated generally by reference numeral 10. Inside of the reactor 10 is the reaction chamber 11 which is vertically oriented and is generally cylindrical in shape, being defined by cylindrical casing 12 and bottom and top end enclosures 13, all manufactured from mild steel or the like. Located adjacent the upper end of reactor 10 is a monomer injection pipe 4, by means of which suitable styrene monomer compositions may be introduced into the reaction chamber 11. In the center of bottom wall 13 of the reactor is located the corresponding polymeric product outlet pipe 9 through which polymer, typically in a solution of a high percentage of unpolymerized monomer, is withdrawn from the reaction chamber. Vertically extending baffle members 14 are positioned radially around the inside wall of the casing 12, and these baffles extend substantially the entire length of the side wall of reaction chamber 11. Baffles 14 serve to support the outer bank of cooling coils 15 which also extend vertically substantially over the entire length of the side wall of reaction chamber 11. The baffles 14 likewise serve to support the interior bank of cooling tubes 16 which extend from the bottom wall 13 of the reaction chamber vertically upward only within the lower portion of the reaction chamber. Rotatably positioned in the central vertical axis of the reactor 10 is a steel shaft 17 which is driven by means of motor 18 mounted at the top of reactor 10 on the motor mount 19 provided therefor. The rotating shaft 17 carries a plurality of horizontally oriented disks 20 to which are attached a plurality of flat blade members 21, by means of which heat transfer and circulation within the reaction chamber 11 are accomplished.

The exact configuration of the temperature control and agitating means located within and about the reaction chamber 11 is best described with reference to FIGS. 2, 3 and 4 of the drawings. In FIG. 2, for example, the configuration of the cooling coil bank may be perceived more clearly. The outer bank of cooling coils 15 is made up of a plurality of individual coil circuits which extend about the entire periphery of the reaction chamber 11, each such circuit beginning at the inlet coolant header pipe 24 and completing its path at the outlet coolant header pipe 25. Both coolant header pipes 24 and 25 pass through the bottom wall 13 and are adapted for connection with a source of cooling fluid, such as water, by means of the flange assemblies 26 and 27. Although it is not too clearly seen, each of the cooling coils 15 is inclined slightly away from the inlet header pipe 24 toward the outlet header pipe 25 in order to promote better drainage properties.

With reference to FIGS. 2 and 4, it is seen that the interior bank of cooling coils 16 is constructed quite similarly to the outer bank of cooling coils, in the sense that the bank is constructed from a plurality of vertically spaced independent coil circuits which emanate and terminate at a cooling liquid inlet header 28 and a cooling liquid outlet header 29 respectively as shown in FIG. 1. The inner bank of cooling coils 16 is likewise supported by the baffle members 14. The inner bank of cooling coils is the primary source of heat dissipation in the reaction chamber 11 and is therefore operated continuously during the polymerization process which is conducted in the reactor 10. Independent of the particular level of contents in the reactor, efficient and concentrated heat dissipation may be accomplished by the inner bank of coils 16 located only in the bottom portion of reaction chamber 11 because of the reactor content flow pattern established as a result of the particular design of the agitation members according to the invention. Specifically, it is necessary that this bank of cooling coils 16 extend upwardly to at least above the height of the lowermost disk 20 carrying the blade members 21. The outer bank of cooling coils 15 is provided within the reaction chamber 11 only as a safety precaution, should it become necessary, because of downstream difficulties or the like, to rapidly cool the contents of the reactor 10 in order to quench the polymerization reaction taking place therein. Consequently, this bank of cooling coils is normally not in operation. All of the cooling coils described hereinabove are preferably fabricated from stainless steel to minimize corrosion effects, although such tubes manufactured from mild steel are equally as good in most applications.

In FIG. 2, it can likewise be seen that the outer surface of casing 12 of the reactor 10 is provided with a heating fluid jacket 34 which permits circulation of a heating fluid about the entire periphery of at least the sidewalls and preferably also bottom wall 13 in the event that it should become necessary to suspend the polymerization process, but at the same time maintain any contents of the reactor 10 in a fluid condition and prvent the same from hardening.

In FIG. 2 is also illustrated clearly the structure of center shaft 17 and the agitation members comprised of disks 20 and blades 21 which are carried by the shaft 17. Each disk 20 is a solid integral disk of metal or the like, as is better viewed in the cross-sectional views in FIGS. 3 and 4 of the drawings. Each disk 20 is keyed to the shaft 17, with means being provided to vertically displace each disk a given distance in either direction in order to adjust same for the accommodation for more or fewer disk members along the shaft. This factor of adjustment can be provided, for example, by providing a series of spaced notches along shaft 17 into which a given disk 20 may be appropriately keyed. The flat blade members 21 are fitted into corresponding notches about the periphery of disks 20 and are secured in such notches so that they extend radially outward from the center shaft 17. On the lowermost disk 20, the flat blade members 21 are fixed to the disks such that they are vertically oriented with respect to their flat surfaces. On the other hand, for each of the disks 20 other than the lowermost disk, the blade members 21 are fixed at an angle with respect to the plane defined by the disk 20. Preferably, this angle is approximately 45°. Thus, when shaft 17 is rotated by motor 18, the oblique disposition of the blades 21 on the uppermost disks 20 serve to create a downwardly directed draft within the mass of reactants within the reactor 10.

In a typical embodiment of the reactor in accordance with the present invention, the tangent length of the reactor unit is 174 inches and the outside diameter of the reactor is 108 inches thereby resulting in a reactor having a 7,500 gallon capacity. The central shaft contains three disk members each having a diameter of approximately three feet and each having secured thereto four flat 9 ×12 inch blade members secured at 90°radial angles about the circumference of the disk members. The outer bank of cooling coils consists of 168 one-half inch carbon steel coils having 1 inch vertical spacing therebetween. The inner coil-bank near the bottom of the reactor consists of 130 one-half inch stainless steel coils, also having 1 inch vertical spacing therebetween. Headers for both banks of coils are four inch tube. There are positioned equidistantly around the circumference of the reactor six 3½ inch baffles having a vertical length of 14½ feet.

In a typical polymerization process conducted with the foregoing reactor embodiment, the following data are obtained:

| Material | Input (lbs/hr) | Output (lbs/hr) |
| --- | --- | --- |
| Styrene monomer | 12,993 (30°C) | 7,222 |
| Ethylbenzene/cumene | 80 | 80 |
| Non-aromatics | 80 | 80 |
| Oligomers | — | 20 |
| Water | 10 | 10 |
| Polystyrene | — | 5,751 |
| Retention time | 3 hrs. | |
| Internal pressure | 50 psig | |
| Internal temperature | 135°C. | |
| Cooling fluid | 200 GPM at 50 psig | |
| | Temp. in 100°C. | |
| | Temp. out 104°C. | |

In FIG. 5 is illustrated the incorporation of the present reactor 10 into a continuous overall styrene mass polymerization process. Polymer leaving reactor 10, typically between about 30 and 50% monomer conversion, is led via line 40 to a second reactor 41, no pump being necessary to effect this transport. Reactor 41 is a conventional horizontal stirred isothermal variable filled liquid phase reactor. Any monomer vapor flashed off in reactor 41 is recycled to reactor 10 via line 42 condenser 43 and holding tank 44.

The polymeric product exiting from reactor 41 contains between about 70 and 80% styrene polymer and is conveyed via line 45 to a devolatilization unit 46. In the devolatilizer, residual styrene monomer is flashed-off and withdrawn in line 47, while substantially pure styrene polymer exits at line 48. The styrene vapor stream 47 is conducted to a contacting apparatus 49 wherein styrene oligomer and high boiling organic compounds, e.g., various additives, are removed from the vapor stream. A substantially pure styrene vapor stream exits contactor 49 via line 50 and is then condensed in condenser 51 for recycle to the polymerization reactor 10.

Other and further variations and application will be apparent to those skilled in the art from a reading of the present specification taken with the drawings. No limitations are to be implied from the foregoing illustrative example.

What is claimed is:

1. An apparatus adapted for use in continuous bulk polymerization of alkenylaromatic monomers, comprising a vertically oriented generally cylindrical chamber formed by a casing provided with terminal closures and having a monomer input means near its upper end and a polymeric product output means near its lower end, coil means for cooling at least the lower portion of said chamber, a rotatable member positioned along the vertical axis of said chamber comprising a center shaft having a plurality of integral circular horizontally oriented disk members positioned in vertically spaced relationship therealong, each of said disk members having attached at spaced intervals about its circumference a plurality of radially extending flat blade members, the blade members of lowermost disk member being vertically oriented with respect to their flat surfaces and all blade members of the remaining disk members having their flat surfaces oriented at an angle upwardly inclined in the direction of rotation with respect to the plane of said horizontal disk members, and a driving means to provide rotation therein.

2. The apparatus as defined by claim 1, further comprising a plurality of vertical baffle members positioned in spaced relationship about the circumference of said chamber casing.

3. The apparatus as defined by claim 2, wherein said cooling means comprises a first set of a plurality of cooling coils extending around the entire circumference of said chamber and being positioned in vertically spaced relationship adjacent the entire vertical length of the inner wall of said chamber casing and being supported by said baffle members, and a second set of a plurality of cooling coils extending around the entire circumference of said chamber, being positioned radially inwardly from said first set of cooling coils and extending vertically from the bottom of said chamber to a point at least above the plane of the lowermost disk member.

4. The apparatus as defined by claim 1, further comprising a heating fluid jacket surrounding at least the side wall portions of said chamber casing.

5. The apparatus as defined by claim 1, further comprising means providing for vertical adjustment of said disk members along said shaft.

6. The apparatus as defined by claim 1, wherein there is a total of three disk members.

7. The apparatus as defined by claim 1, wherein the blade members of said remaining disk members have their flat surfaces upwardly inclined at a 45° angle in the direction of rotation with respect to the plane of the horizontal disk members.

8. The apparatus as defined by claim 1, wherein there are four blade members positioned at 90° intervals on each of said disk members.

* * * * *